United States Patent
Progl et al.

[19]

[11] Patent Number: 6,075,696
[45] Date of Patent: Jun. 13, 2000

[54] PORTABLE COMPUTER WITH FLEXIBLE HEAT SPREADER PLATE STRUCTURE THEREIN

[75] Inventors: Curtis L. Progl, Montgomery; Allen P. Zhang, Houston, both of Tex.

[73] Assignee: Compaq Computer Corporation, Houston, Tex.

[21] Appl. No.: 08/964,382

[22] Filed: Nov. 6, 1997

[51] Int. Cl.[7] .................................. G06F 1/20; H05K 7/20
[52] U.S. Cl. ............................................. 361/687; 16/226
[58] Field of Search .................................... 361/687, 699, 361/700; 174/15.2; 165/86, 104.33; 16/226

[56] References Cited

U.S. PATENT DOCUMENTS

| | | | |
|---|---|---|---|
| 5,621,613 | 4/1997 | Haley et al. | 361/687 |
| 5,718,282 | 2/1998 | Bhatia et al. | 165/86 |
| 5,757,615 | 5/1998 | Donahoe et al. | 361/687 |
| 5,796,581 | 8/1998 | Mok | 361/687 |
| 5,847,925 | 12/1998 | Progl et al. | 361/687 |

*Primary Examiner*—Lynn D. Feild
*Assistant Examiner*—Lisa Lea-Edmonds
*Attorney, Agent, or Firm*—Konneker & Smith, P.C.

[57] ABSTRACT

Operational heat generated by an electronic component in the base housing of a notebook computer is transferred to the back wall of its display housing for dissipation to ambient by a heat pipe disposed in the base housing and having an evaporator portion in thermal contact with the heat-generating component, and a spreader plate structure formed from multiple thin metal layers. The spreader plate structure has a heat dissipation portion disposed within the display housing and held in thermal contact with its back wall, a pickup region disposed in the base housing and held in thermal contact with a condensing portion of the heat pipe, and a bendable dynamic portion positioned between the heat dissipation and pickup portions and extending through the lid hinge area of the computer. Each metal sheet in the dynamic region has a thin layer of a plastic material secured to its opposite sides and serving to reinforce the sheet and prevent abrasive rubbing between facing metal sheets during bending thereof as the display housing is pivotally opened and closed. Operating heat from the component is transferred to the lid housing back wall sequentially through the heat pipe and the pickup, dynamic and spreader portions of the plate structure.

20 Claims, 2 Drawing Sheets

PORTABLE COMPUTER WITH FLEXIBLE HEAT SPREADER PLATE STRUCTURE THEREIN

BACKGROUND OF THE INVENTION

1. Field of the Invention

The present invention generally relates to the dissipation of operating heat from portable computers and, in a preferred embodiment thereof, more particularly relates to apparatus for transferring heat generated within the base housing of a portable computer to its lid housing for dissipation to ambient.

2. Description of Related Art

As portable computers become more sophisticated and powerful, being provided with faster and more densely packed electronic components in their interiors, the effective dissipation of operating heat from the computer becomes an increasingly critical design task. In a typical construction thereof the popular "notebook" portable computer includes a base housing in which the main heat generating electronic components such as a processor, hard, floppy and CD ROM drives and the like are disposed, and a display screen housing pivotally secured to a rear top side edge portion of the base housing.

In early versions of the notebook computer the base housing operating heat was simply allowed to transfer outwardly to the base housing exterior surface for dissipation to ambient. However, as the operating heat loads increased it became more difficult to maintain the exterior surface temperature of the base housing at an acceptable temperature. Thus, more exotic and correspondingly more expensive heat dissipation techniques, such as internal cooling fans and heat sinks within the base housing were employed.

A recent approach to this increasing operating heat dissipation problem in notebook computers has been to transfer at least some of the operating heat generated in the base housing to the display screen housing for dissipation to ambient. The two primary design challenges presented in attempting to transfer base housing heat to the display housing are (1) the potential problem of creating undesirable temperature rises in portions of the display housing, and (2) the necessity of transferring heat through the hinge area that pivotally couples the base and display housings.

A proposed solution to these problems is illustrated and described in copending U.S. application Ser. No. 08/769,795 filed on Dec. 19, 1996, now U.S. Pat. No. 5,781,409 and assigned to the same assignee as the present application. Shown in such copending application is a base-to-display housing operating heat transfer system utilizing a first heat pipe disposed in the base housing, a second heat pipe disposed in the display housing, and a copper hinge block disposed in the display housing.

An evaporating end portion of the first heat pipe is in thermal communication with a heat generating component within the base housing, and a condensing end portion of the first heat pipe is rotatably received within the hinge block and lubricated therein with thermal grease. Thus, when the display housing is pivoted relative to the base housing, the hinge block is rotated about the condensing end of the first heat pipe. An evaporating end portion of the second heat pipe is fixedly secured within the hinge block, and a condensing end portion of the second heat pipe is in thermal communication with the back wall of the display housing.

Operating heat from the heat generating component within the base housing is thus sequentially transferred through the first heat pipe to the hinge block, from the hinge block to the second heat pipe, and through the second heat pipe to the display housing back wall for dissipation therefrom to ambient.

While this previously proposed method of transferring operating heat from the base housing of a portable computer to its display housing for dissipation therefrom to ambient desirably results in lowered base housing exterior surface temperatures during operation of the associated computer, it carries with it certain limitations and disadvantages.

For example, extra weight is added to the overall computer by the copper hinge block; surface degradation from the frictional wear between the first heat pipe condensing end portion and the hinge block can lead to a reduction in heat transfer interface reliability at this portion of the heat transfer system; repeated flexing of the condensing end portion of the first heat pipe at the entrance to the hinge block can potentially fatigue the first heat pipe; and a relatively high heat transfer structure cost is presented by the requirement for two heat pipes and the copper hinge block structure.

In view of this it can be readily seen that a need exists for improved apparatus for transferring base housing operating heat to the display or lid housing of a portable computer. It is to this need that the present invention is directed.

SUMMARY OF THE INVENTION

In carrying out principles of the present invention, in accordance with a preferred embodiment thereof, specially designed heat transfer apparatus is provided for transferring operating heat generated by a component in, for example, the base housing of a portable computer to the lid housing of the computer for dissipation therefrom to ambient.

The heat transfer apparatus comprises a heat conductive plate structure having a first portion, a second portion spaced apart from the first portion, and a bendable third portion interconnecting the first and second portions and being defined by a stacked plurality of heat conductive sheet portions. Preferably the plate structure is formed from a stacked plurality of metal sheet members.

Layers of protective film material are disposed on opposite side portions of the metal sheet sections in the bendable third portion of the plate structure and serve to reinforce these sheet sections and prevent potentially abrasive rubbing together thereof during bending of the third portion of the plate structure. Preferably, the protective film material is a thermally insulative nonmetallic material, representatively a polyimide material.

In a preferred embodiment thereof, the heat transfer apparatus also comprises a thermosyphoning heat pipe having a condensing portion secured to the first portion of the plate structure in a heat transfer relationship therewith, and an evaporating portion extending outwardly from the first portion of the plate structure. Representatively, the first plate structure portion is wrapped around the condensing portion of the heat pipe.

According to another feature of the invention, the heat transfer apparatus is incorporated in an electronic apparatus, representatively a portable notebook computer having a base housing in which the heat-generating component is disposed, and a lid housing secured by a hinge structure to the base housing for pivotal movement relative thereto between open and closed positions.

The first plate structure portion is disposed in the base housing, with the evaporating portion of the heat pipe being secured to the heat-generating component, representatively using a metal heat collector plate, and the condensing portion of the heat pipe is suitably anchored to the base housing. The second plate structure portion is disposed in the lid housing in thermal communication with, and extending along a major inner side portion of the back wall of the lid housing.

The bendable third plate structure portion, which is bent in response to opening and closing the lid housing, is preferably extended through a hollow central portion of the hinge structure. During operation of the computer, operating heat from the heat-generating component in the base housing is sequentially transferred through the heat pipe to the first plate structure portion, from the first plate structure portion through the third portion to the second plate structure portion, and from the second plate structure portion to the back wall of the lid housing for dissipation from its outer side surface to ambient.

DETAILED DESCRIPTION

Figure 1:
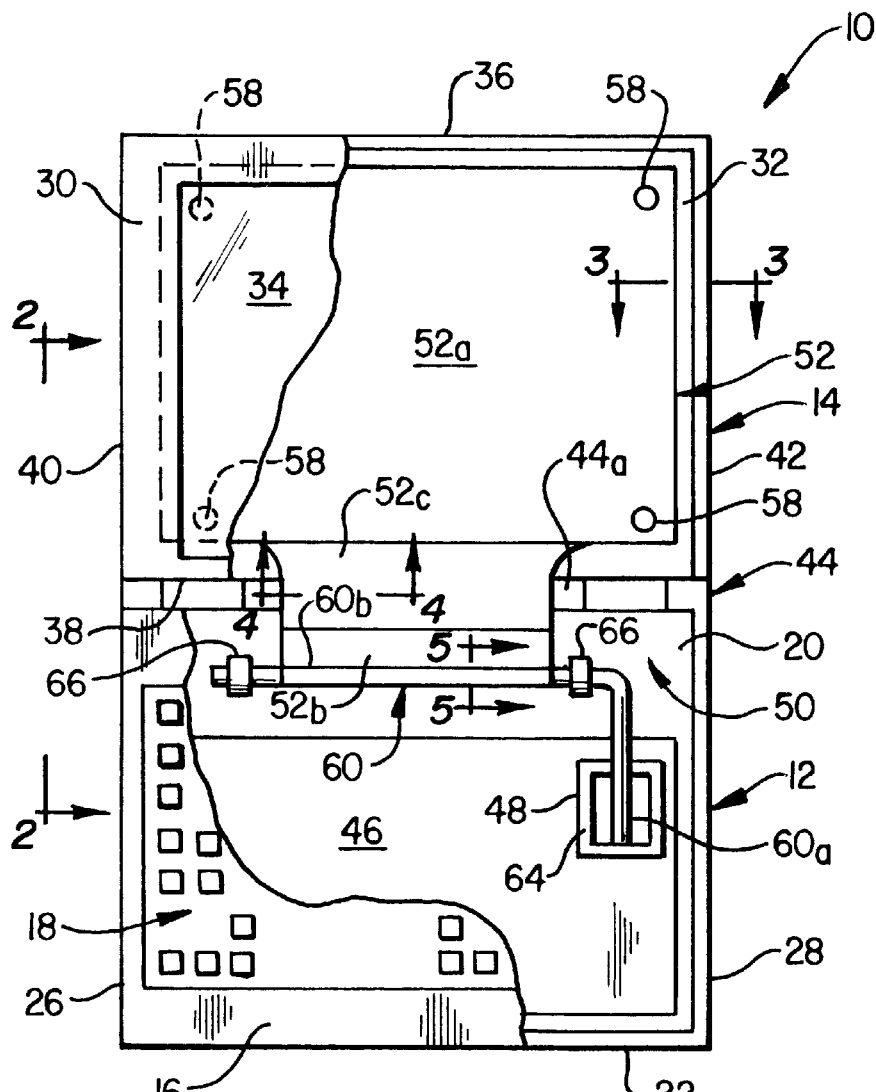
FIG. 1 is a partially cut away schematic top plan view of a representative fully opened portable computer having incorporated therein a flexible heat spreader plate structure embodying principles of the present invention and used to efficiently transfer operating heat from the base housing of the computer to its lid housing using a single heat pipe.

Shown in simplified, partially cut away form in FIG. 1 is a top plan view of an electronic apparatus, representatively a portable notebook computer 10, in a fully opened configuration as later described herein. Computer 10 includes generally rectangular base and lid housings 12 and 14 which are illustratively formed from a suitable plastic material.

Figure 2A:
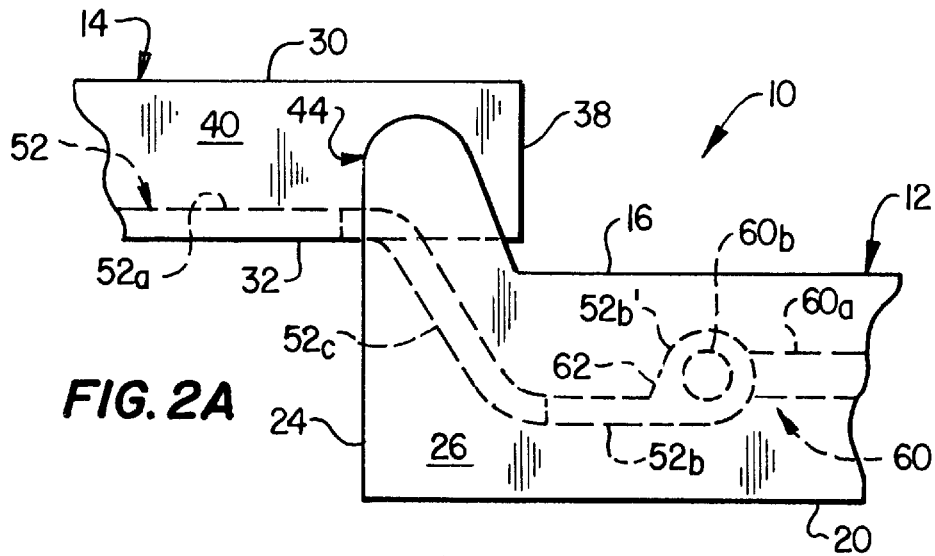
FIGS. 2A–2C are schematic partial side elevational views of the computer, taken generally along line 2—2 of FIG. 1, and illustrate in phantom the position of the flexible heat spreader plate structure with the computer respectively in fully opened, partially opened and closed orientations.

Referring now additionally to FIG. 2A, base housing 12 has a top side wall 16 upon which a keyboard assembly 18 is operatively supported, a bottom side wall 20, front and rear side walls 22 and 24, and left and right end walls 26 and 28. Lid housing 14 has opposite side walls 30 and 32, with a display screen 34 being operatively mounted on side wall 32, front and rear side edge walls 36 and 38, and left and right end edge walls 40 and 42.

A hinge structure, which is generally denoted at 44, interconnects adjacent rear edge portions of the base and lid housings 12 and 14 in a manner permitting the lid housing 14 to be selectively pivoted relative to the base housing 12 to (1) a closed storage and transport orientation (see FIG. 2C) in which the lid housing 14 extends across and covers the top side 16 of the base housing 12, (2) a partially opened use orientation (see FIG. 2B) in which the lid housing 14 is generally upright, with its side wall 30 (and the associated display screen 34) facing the user of the computer, or (3) a fully opened, generally "flat" orientation (see FIG. 2A) in which the lid housing 14 is pivoted approximately 180 degrees away from the top side wall 16 of the base housing 12. Suitable latch means (not shown) are provided for holding the lid housing 14 in its FIG. 2C closed orientation.

A printed circuit board 46 (see FIG. 1) is operatively disposed within the interior of the base housing 12, beneath the keyboard assembly 18, and has a heat-generating component, representatively a processor 48, thereon. According to a key aspect of the present invention, specially designed heat dissipation means 50 are provided for transferring operating heat from the heat-generating component 48 to the lid housing 14 for dissipation therefrom to ambient.

Figure 2B:
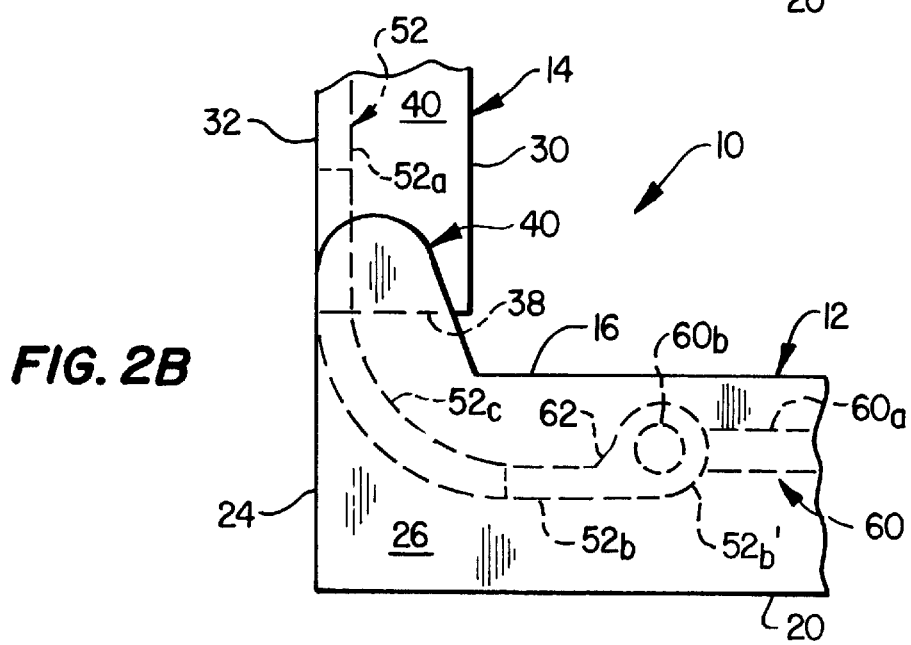
Figure 2C:
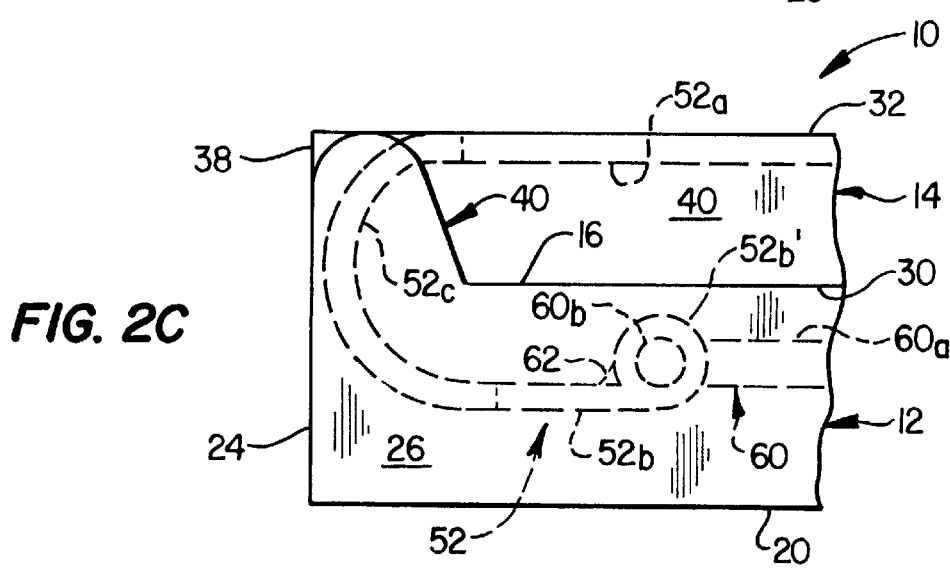

The heat dissipation means 50 include a heat conductive metallic plate structure 52 having a heat spreader portion 52a disposed within the lid housing 14, a heat pickup portion 52b disposed within the base housing 12, and a bendable dynamic heat transfer portion 52c that is interposed between the plate structure portions 52a, 52b and extends through a shrouded hollow central portion 44a of the hinge structure 44 (see FIGS. 1–2C).

Figure 3:
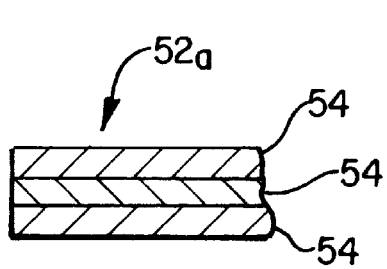
FIG. 3 is an enlarged scale partial cross-sectional view through a main display housing body portion of the flexible heat spreader plate structure taken along line 3—3 of FIG. 1.
Figure 4:
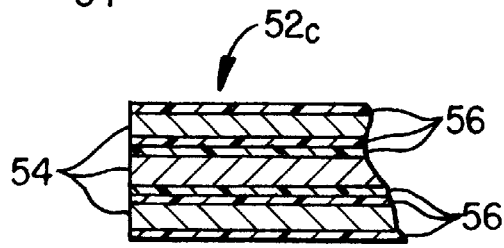
FIG. 4 is an enlarged scale partial cross-sectional view through a bendable dynamic portion of the flexible heat spreader plate structure taken along line 4—4 of FIG. 1.
Figure 5:
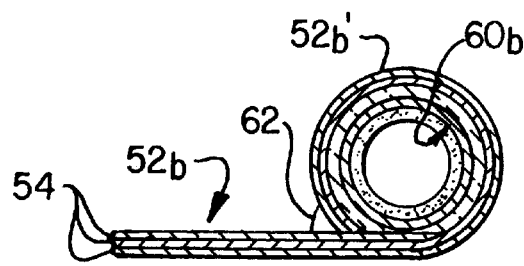
FIG. 5 is an enlarged scale partial cross-sectional view through a heat pick-up portion of the flexible heat spreader plate structure taken along line 5—5 of FIG. 1.

As illustrated in FIGS. 3–5, plate structure 52 is preferably defined by a stacked plurality of individual metal sheets 54 (representatively three in number) which collectively define the three portions 52a, 52b, 52c of the plate structure 52. The depicted metal sheets 54 (see FIG. 3) are of a tin/lead-plated copper material having a total sheet thickness of approximately 0.005", but could be of other metal materials such as unplated copper or aluminum.

Suitably adhered to the opposite sides of the plates 54 in the dynamic plate structure portion 52c are layers of a flexible wear coating material 56 which serve to strengthen the plates 54 in this dynamic, bendable area and prevent metal-to-metal rubbing therein as the plate structure portion 54c bends during pivoting of the lid housing 14 as later described herein. Preferably, the layers 56 are of a nonmetallic, thermally insulative material, and are representatively 0.0001" thick layers of the polyimide film material manufactured by the Dupont Company under the tradename "KAPTON".

As illustrated in FIG. 1, the heat spreader portion 52a of the plate structure 52 has a rectangular shape, and extends across and covers a major interior side surface portion of the side wall 32 of the lid housing 14. To secure the heat spreader portion 52a against the side wall 32, in thermal communication therewith, inwardly projecting boss portions 58 of the side wall 32 are extended through corresponding openings in the plate structure 52a and then thermally deformed to heat stake the plate structure 52a to the side wall 32.

The heat dissipation means 50 also includes a thermosyphoning heat pipe 60 having an evaporating or heat-receiving longitudinal portion 60a, and a condensing or heat-rejecting longitudinal portion 60b which representatively extends transversely to the evaporating portion 60a. As best illustrated in FIG. 5, an outer end section 52b' of the plate structure pickup portion 52b is wrapped around the heat pipe condensing portion 60b, in thermal communication therewith, and held in such orientation by a suitable weld or braze joint 62.

The heat pipe evaporating portion 60a (see FIG. 1) is secured to the top side of a metal heat collector plate 64 in thermal communication therewith. In turn, the metal collector plate 64 is secured to the top side of the heat-generating component 48 in thermal communication therewith. Sections of the heat pipe condensing portion 60b on opposite sides of the plate structure pickup portion 52b are supportingly anchored to the base housing bottom wall 20 by suitable support bracket structures 66.

During operation of the computer 10, heat generated by the component 48 is transferred sequentially to the collector plate, through the heat pipe 60 to the plate structure pickup portion 52b, through the bendable plate structure dynamic portion 52c to the plate structure heat spreader portion 52a, and from the heat spreader portion 52a to a major interior side surface portion of the lid housing side wall 32 for dissipation from the outer side surface thereof to ambient.

As schematically depicted in FIGS. 2A–2C, the dynamic plate structure portion 52c that extends through a central portion of the hinge structure 40 readily flexes and bends an necessary to accommodate the pivoting of the lid housing 14 between its FIG. 2C closed orientation and its FIG. 2A fully opened orientation. As previously mentioned, the wear coating material 56 (see FIG. 4) present on the opposite sides of each individual sheet section of the dynamic plate structure portion 52c strengthens and reinforces this bending area and prolongs its life by preventing metal-to-metal rubbing contact therein.

Compared to the hinge block and dual heat pipe heat dissipation mentioned previously herein, the heat dissipation means 50 of the present invention provides a variety of advantages including the elimination of the necessity of installing two heat pipes; the elimination of the copper hinge block; the elimination of the need for thermal grease; the limitation of wear in the heat dissipation means to the dynamic plate structure region 52c; the substantial elimination of heat pipe mechanical stress; and a substantial reduction in cost for the overall heat dissipation means. Additionally, the heat spreader portion 52a, in addition to efficiently transferring component operating heat to the lid housing side wall 32, also advantageously serves to stiffen the wall 32 and add at least a measure of EMI shielding for the lid housing 14.

While the plate structure 52 is preferably formed from a plurality of metal sheets that each define layers of the three plate structure portions 52a, 52b and 52c, it will be readily be appreciated by those of skill in this particular art that a variety of modifications could be made to the overall plate structure 52 if desired. For example, the heat spreader portion 52a and/or the pickup portion 52b could be a thicker single sheet construction with the dynamic portion 52c being formed from a plurality of thinner metal sheets. Additionally, while a multiple sheet construction is preferred for the overall plate structure 52, a single sheet could alternatively be utilized if desired.

The foregoing detailed description is to be clearly understood as being given by way of illustration and example only, the spirit and scope of the present invention being limited solely by the appended claims.

What is claimed is:

1. Electronic apparatus comprising:
a first housing having a heat-generating component disposed therein;
a second housing supported on said first housing for pivotal movement relative thereto between open and closed positions; and
heat dissipation apparatus for dissipating operating heat generated by said heat-generating component, said heat dissipation apparatus including a plate structure formed from a heat conductive material and having a first portion disposed in said first housing in thermal communication with said heat-generating component, a second portion disposed in said second housing in thermal communication therewith, and a bendable third portion interconnecting said first and second portions of said plate structure, said bendable third portion being formed from a stacked plurality of relatively movable metal sheet members having a flexible protective film material positioned between facing side surfaces thereof to prevent metal-to-metal rubbing contact between said facing side surfaces during bending of said third portion.

2. The electronic apparatus of claim 1 wherein said electronic apparatus is a portable computer.

3. The electronic apparatus of claim 2 wherein said portable computer is a notebook computer.

4. The electronic apparatus of claim 1 wherein:
said electronic apparatus further comprises a hinge structure pivotally interconnecting said first and second housings, and
said bendable third portion of said plate structure extends generally through said hinge structure.

5. The electronic apparatus of claim 1 wherein said flexible protective film material is a thermally insulative material.

6. The electronic apparatus of claim 5 wherein said flexible protective film material is a nonmetallic material.

7. The electronic apparatus of claim 6 wherein said flexible protective film material is a polyimide material.

8. The electronic apparatus of claim 1 wherein said heat dissipation apparatus further includes:
a heat pipe disposed in said first housing and having an evaporating portion in thermal communication with said heat-generating component, and a condensing portion in thermal communication with said first portion of said plate structure.

9. The electronic apparatus of claim 1 wherein said bendable third portion of said plate structure transfers heat from said first portion to said second portion essentially only by conduction.

10. Heat transfer apparatus comprising:
a heat conductive plate structure having a first portion, a second portion spaced apart from said first portion, and a bendable third portion interconnecting said first and second portions and being defined by a stacked plurality of relatively movable heat conductive metal sheet sections;
layers of protective film material positioned between facing side surface portions of said stacked metal sheet sections of said third portion of said heat conductive plate structure and serving to reinforce said sheet sections and prevent potentially abrasive rubbing together thereof during bending of said third portion of said plate structure; and
a thermosyphoning heat pipe having a first longitudinal portion secured to said first portion of said plate structure in a heat transfer relationship therewith, and a second longitudinal portion extending outwardly from said first portion of said plate structure.

11. The heat transfer apparatus of claim 10 wherein said bendable third portion of said plate structure is capable of transferring heat between said first and second portion essentially only by conduction.

12. The heat transfer apparatus of claim 10 wherein said protective film material is a thermally insulative material.

13. The heat transfer apparatus of claim 12 wherein said protective film material is a polyimide material.

14. The heat transfer apparatus of claim 10 wherein said second portion of said plate structure is wrapped around said first longitudinal portion of said thermosyphoning heat pipe.

15. A portable computer comprising:
- a base housing having a heat-generating component disposed therein;
- a lid housing;
- a hinge structure supporting said lid housing on said base housing for pivotal movement relative thereto between open and closed positions; and
- heat dissipation apparatus for transferring operating heat from said heat-generating component to said lid housing for dissipation to ambient, said heat dissipation apparatus including:
  - a plate structure formed from a heat conductive material and having a first portion disposed in said base housing, a second portion disposed in said lid housing in thermal communication therewith, and a bendable third portion interconnecting said first and second portions of said plate structure and extending generally through said hinge structure, said bendable third portion being formed from a stacked plurality of relatively movable metal sheet members having a flexible protective film material positioned between facing side surfaces thereof to prevent metal-to-metal rubbing contact between said facing side surfaces during bending of said third portion, and
  - a thermosyphoning heat pipe disposed in said base housing and having a condensing portion in thermal communication with said first portion of said plate structure, and an evaporating portion in thermal communication with said heat-generating component.

16. The portable computer of claim 14 wherein:
said plate structure is defined by a stacked plurality of metal sheets, and
the metal sheet sections in said third portion of said plate structure have a protective film material disposed on side surfaces thereof and serving to reinforce said sheet sections and prevent metal-to-metal rubbing thereof during bending of said third portion of said plate structure.

17. The portable computer of claim 14 wherein:
said portable computer further comprises a heat conductive collector plate secured to said heat-generating component in thermal communication therewith, and
said evaporator portion of said heat pipe is secured to said heat collector plate in thermal communication therewith.

18. The portable computer of claim 16 further comprising support means for anchoring said evaporator portion of said heat pipe to said base housing.

19. The portable computer of claim 14 wherein said bendable third portion of said plate structure transfers heat from said first portion to said second portion essentially only by conduction.

20. Electronic apparatus comprising:
- a first housing having a heat-generating component disposed therein;
- a second housing supported on said first housing for pivotal movement relative thereto between open and closed positions; and
- heat dissipation apparatus for dissipating operating heat generated by said heat-generating component, said heat dissipation apparatus including a heat transfer plate structure having a first portion disposed in said first housing in thermal communication with said heat-generating component, a second portion disposed in said second housing in thermal communication therewith, and a bendable third portion interconnecting and thermally communicating said first and second portions of said heat transfer plate structure,
  - said bendable third portion being formed from a stacked plurality of relatively movable, highly heat conductive flexible sheet members having a flexible protective material disposed between facing side surfaces thereof and functioning to prevent rubbing contact between said facing side surfaces during bending of said third portion of said heat transfer plate structure.

* * * * *